US010831590B2

(12) United States Patent
Petrini et al.

(10) Patent No.: US 10,831,590 B2
(45) Date of Patent: Nov. 10, 2020

(54) ERROR HANDLING

(71) Applicant: International Business Machines Corporation, Armonk, NY (US)

(72) Inventors: Brian M. Petrini, Chula Vista, CA (US); Kim Julian Clark, London (GB); Olaf Hahnl, Bielefeld (DE)

(73) Assignee: International Business Machines Corporation, Armonk, NY (US)

( * ) Notice: Subject to any disclaimer, the term of this patent is extended or adjusted under 35 U.S.C. 154(b) by 147 days.

(21) Appl. No.: 15/830,102

(22) Filed: Dec. 4, 2017

(65) Prior Publication Data

US 2019/0171512 A1 Jun. 6, 2019

(51) Int. Cl.
*G06F 11/00* (2006.01)
*G06F 11/07* (2006.01)

(52) U.S. Cl.
CPC ...... *G06F 11/0793* (2013.01); *G06F 11/0709* (2013.01); *G06F 11/079* (2013.01); *G06F 11/0751* (2013.01)

(58) Field of Classification Search
CPC .................................................. G06F 11/0793
USPC .................................. 714/2, 1, 4.1, 47.1, 48
See application file for complete search history.

(56) References Cited

U.S. PATENT DOCUMENTS

| 7,076,762 B2 | 7/2006 | Fisher | |
| 7,412,626 B2* | 8/2008 | Wood | H04L 41/064 |
| | | | 714/38.1 |
| 7,937,624 B2* | 5/2011 | Qing | G06F 8/31 |
| | | | 714/48 |
| 2002/0029299 A1* | 3/2002 | Kappel | G06F 9/4812 |
| | | | 719/318 |
| 2003/0167421 A1* | 9/2003 | Klemm | G06F 9/3861 |
| | | | 714/37 |
| 2004/0078667 A1* | 4/2004 | Salem | G06F 11/0778 |
| | | | 714/26 |
| 2005/0262472 A1* | 11/2005 | Wood | G06Q 10/06 |
| | | | 717/102 |
| 2006/0248406 A1 | 11/2006 | Qing et al. | |
| 2012/0331340 A1 | 12/2012 | Birkler et al. | |
| 2015/0193296 A1* | 7/2015 | Chen | G06F 11/079 |
| | | | 714/15 |
| 2019/0028342 A1* | 1/2019 | Kommula | H04L 41/06 |

FOREIGN PATENT DOCUMENTS

| CN | 102081970 | 6/2011 |
| CN | 102291508 | 12/2011 |

OTHER PUBLICATIONS

Wikipedia "Packet analyzer" page from date Oct. 12, 2017, retrieved using the WayBackMachine from https://web.archive.org/web/20171012122522/https://en.wikipedia.org/wiki/Packet_analyzer (Year: 2017).*
GB90160689PCT01, ISR and Written Opinion, dated Jan. 30, 2019, 10 Pages.

* cited by examiner

*Primary Examiner* — Yair Leibovich
(74) *Attorney, Agent, or Firm* — Schmeiser, Olsen & Watts, LLP; Christopher Pignato

(57) ABSTRACT

A method, computer program product, and error component is provided, which may include receiving a request for a service of the provider, from the requester, determining a requirement of the request, and identifying, by the processor, a handling algorithm for handling errors based on the requirement of the request and a characteristic of the service provider.

22 Claims, 6 Drawing Sheets

ERROR HANDLING

TECHNICAL FIELD

The present invention relates to error handling, and more particularly error handling between a requester and provider

BACKGROUND

Currently, many business processes rely on distributed processing architectures, such as service-oriented architectures (SOAs). The architectures facilitate the cooperation of components, systems, and/or computers over a network such as the Internet without requiring an agreed communication standard, e.g. message format for communications between such computers.

SUMMARY

A method, computer program product, and error component for error handling between a requester and provider is provided. A processor of a computing system receives a request for a service of the provider, from the requester. A requirement of the request is determined. A handling algorithm is identified for handling errors based on the requirement of the request and a characteristic of the service provider.

DETAILED DESCRIPTION

Figure 1:
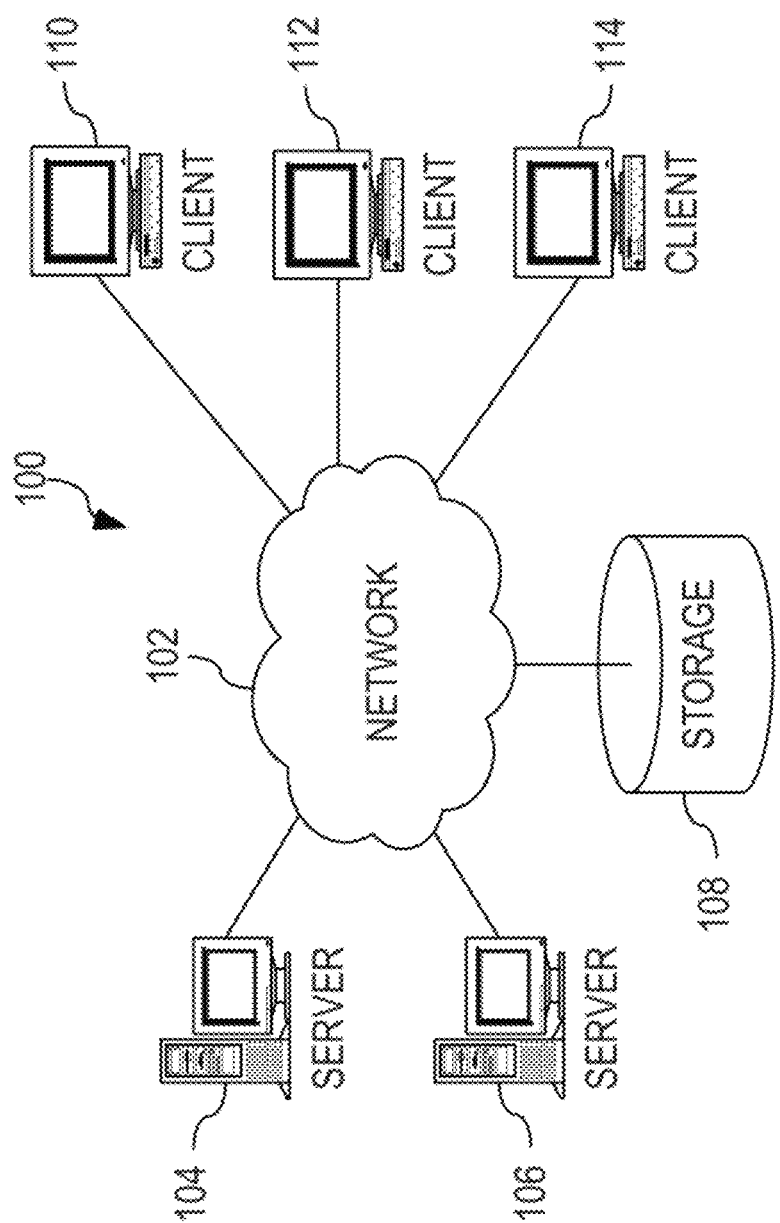
FIG. 1 depicts a pictorial representation of an example distributed system in which aspects of the illustrative embodiments may be implemented, in accordance with embodiments of the present invention.

The implementation of an interaction between systems is relatively easy if the interactions succeed. However, catering for all the permutations of possible error conditions involves understanding issues such as retries, idempotence, healthchecks, transactional boundaries, uniqueness conflicts, transport reliability, latency, time-outs and more. A complex aspect of integration between components, systems, and/or computers relates to error handling.

Typically, error handling algorithms require unique code or instructions for every interaction implemented, such as a unique message flow, or dedicated code within a connector. Error handling implementations are therefore typically unique and written in the programming language/model of the requestor's runtime. Such implementations may thus be complex to write and maintain, and they may also be difficult to re-use.

Where commonality between components, systems and/or computers is found, it is typically only embedded in a code framework, such as the Java Connector Architecture, but this remains a language-specific approach and still requires significant additional and/or unique implementation work to resolve individual subtleties of interactions.

Many products exist for enabling integration between systems, which often have standardized connector frameworks such that new connectors can be written with minimal effort. Some of the connector frameworks are standardized with one such example being the Java Connector Architecture so as to reduce an amount of work required to create new connectors. However, these connectors are typically programming language and/or run-time specific, thus meaning that creation/configuration for one platform does not cater for simple migration/portability to another platform. Also, such connectors typically only cater for low level properties of error handling, such as number of re-tries, or timeout values, rather than addressing logical characteristics of the interaction that would enable full algorithms to be chosen. Accordingly, additional code or flow logic must typically be implemented by a requester in order to cater for the overall interaction requirements.

Furthermore, attempts to create standardized connectors for protocols often neglect the fact that systems often do not adhere strictly to standards, which moves error handling back into the code or integration flow for every interaction.

Embodiments of the present invention may provide a method for error handling between a requester and provider that may provide for significant simplification of integration implementations (e.g. by eliminating a need for bespoke integration code or flow logic). Embodiments of the present invention may further provide a computer program product including computer program code for implementing the method when executed on a processor of a data processing system. Embodiments of the present invention may yet further provide a data processing system adapted to execute this computer program code. Embodiments of the present invention may also provide an error handling component for error handling between a requester and provider.

According to an embodiment of the present invention, there may be provided a computer-implemented method for error handling between a requester and provider. The method may comprise receiving, from the requester, a request for a service of the provider. The method may also comprise determining a requirement of the request. Based on the determined requirement of the request and a characteristic of the service provider, a handling algorithm for handling errors can be identified.

Embodiments of the present invention may identify requirements of the request and characteristics of the provider, and then use the identified requirements and characteristics to determine an algorithm for handling errors. By evaluation of a request requirement, for example, it may be determined as to how the request should be invoked at the provider.

Embodiments may therefore provide a domain-specific policy language for enabling configuration and implementation of common/generic error handling logic/algorithms/scenarios/semantics in a technology agnostic fashion, thus reducing integration implementation code and providing portability across platforms. Such a policy language may provide enhanced (e.g. greater) richness, for example, by employing a vocabulary comprising wide-ranging, varied, exhaustive, descriptive, specific and/or requirement-related terms. The improved richness of a policy language provided by embodiments may enable the provision of policy algorithms with improved, dynamic and/or tailored logic.

Exemplary embodiments of the present invention may provide a declarative error handling method that intercepts requests on a given integration, wherein the integration is defined by a set of requester requirements and provider characteristics. Based on these requirements and characteristics, the method may identify an algorithm for managing errors that may occur. For instance, the algorithm may provide missing behaviors and allow re-classification of non-standard error responses. An exemplary embodiment may therefore have the following properties:

(i) Platform agnostic embodiments may be used across platforms/languages, as the characteristics and algorithms are generic; and (ii) Code minimization/removal—embodiments may reduce a need for custom code for error handling in an interface and, in many cases, may remove the need for custom code completely, thus changing the skillset required to prepare an interface.

By categorizing an interface by characteristics of the interface, and given a set of client (e.g. requester) requirements, exemplary embodiments may identify an error handling algorithm and inject that algorithm into a process flow. The injected error handling algorithm may also be configured to provide any missing characteristics of the provider.

In an exemplary embodiment, one may consider an instance where a client (e.g. requester) wants to make a 'create' request and is OK with using an unreliable medium, but does not want duplicates (e.g. this could be a typical Hypertext Transfer Protocol (HTTP)-based REST request). For such an example, one may consider there being a matching provider with a HTTP interface that is idempotent. An injected error handler algorithm may call the interface multiple times if a retry is needed. However, if the service above was not idempotent, the error handler algorithm could execute a deferred read instead of a retry, which would create a duplicate, to provide the missing 'no duplicates' client requirement. Similarly, if a reliable medium is required, then the call could be bridged over messaging rather than via a web server request, again the injected error handler creates the missing interface characteristics.

Exemplary embodiments of the present invention may be configured to allow configurable override policies to re-align non-standard implementation of protocols.

Exemplary embodiments may provide a domain-specific policy language for expression of error recovery semantics, which may express a large range of error recovery scenarios that would previously have had to be specifically coded and/or configured for each interaction. There may thus be provided a component that enables error handling logic (e.g. policy algorithms) to be chosen and implemented based on domain-specific policy language that describes the characteristics of an interaction in a technology agnostic manner, which may enable error handling requirements to be defined logically once, and then implemented purely by configuration, across multiple technologies.

Benefits provided by exemplary embodiments may therefore include the following:

(i) Significant simplification of integration implementations—Embodiments may eliminate bespoke integration code or flow logic that would otherwise be typically written per protocol and further customized for each service operation;

(ii) Acceleration of the development of connectors;

(iii) Simple migration of implemented integrations to different language runtimes via a common configuration; and (iv) Standardization of algorithms such that error handling behavior may be deterministic and well understood—significantly simplifying preparation and execution of integration regression tests.

The stated benefits may therefore provide improvements on the current state of the art by radical simplification of error handling.

In accordance with exemplary embodiments, there may be provided a domain-specific policy language that uses a component which enables configuration and implementation of an error handling algorithm in a technology agnostic fashion, which may reduce integration implementation code and/or provided improved portability across platforms.

Error handling algorithms may be governed by a key set of logical characteristics about the interaction. Examples may include whether the providers interface can be safely retried without causing duplicates (e.g. idempotence), whether the requester expects an immediate response (e.g. blocking), and what the timeframes are in which the interaction must complete. These characteristics are technology agnostic, and may relate only to the requirements of the requester, capabilities of the provider, and capabilities of the component implementing the algorithm. Based on these characteristics, a specific policy algorithm for how to perform the error handling can be chosen, wherein the algorithms may be technology agnostic, such that the algorithms can be described at a logical level for implementation in any programming language.

In an exemplary embodiment, the requirement of the request may relate to at least one of: an acceptability of duplicates; a confirmation required by the requester; a response time; a throughput; and a transactional participation. Such embodiments may therefore take into account limiting factors or considerations relating to the request and/or the request in order to determine an error handling algorithm to implement. Other different requirements may be determined and/or accounted for by embodiments of the present invention, and these may be considered in isolation or in combination.

In an exemplary embodiment, a characteristic of the provider may relate to at least one of: an interface of the provider; a communication protocol of the provider; availability of a check test; a response time; a throughput; an interaction method of the provider; an idempotent capability of the provider; a synchronous or asynchronous nature of the provider; one or more error types; transaction support; and a behavioral trait of the provider. Embodiments may therefore take into account limiting factors or considerations relating to the provider in order to determine an error handling algorithm to implement. Other different characteristics may be determined and/or accounted for by embodiments of the present invention, which may be considered in isolation or in combination.

Embodiments of the present invention may therefore employ the concept of analyzing requirements and characteristics of an interaction between a requester and provider so as to determine the most appropriate error handling algorithm. In this way, exemplary embodiments may be designed to determine appropriate error handling logic or process steps so as to ensure that the errors are reduced, handled, processed and/or managed whilst reducing programming and/or implementation complexity.

In an exemplary embodiment, the step of identifying a handling algorithm may comprise selecting the handling algorithm from a plurality of algorithms based on the determined requirement of the request and the determined characteristic of the provider. A centralized or shared resource of potential handling algorithms may therefore be leveraged by embodiments. Also, selecting the handling algorithm may comprise selecting the handling algorithm based on whether the determined requirement of the request or the determined characteristic of the provider relates to a predetermined communication protocol, w which may enable previous or established error handling knowledge for particular communication protocols to be drawn upon and used, thus potentially reducing an amount of specialist and/or bespoke programming that would otherwise be required to implement a handling algorithm.

In an exemplary embodiment, the step of identifying a handling algorithm may, for example, comprise selecting the handling algorithm according to a best-fit assessment. In this way, an assessment of the most appropriate handling algorithm for the determined specifics (e.g. requirements and characteristics) of an interaction may be made and a result then used to identify a handling algorithm to use.

The handling algorithm may be configured to assure delivery of the request to the provider. For example, the handling algorithm may be configured to implement at least one of: a retry procedure; a defer procedure; a comparison; and a merge procedure so as to assure delivery of the request to the provider. An algorithm employed by embodiments may therefore provide missing or required processes in order to ensure that a request can be correctly invoked and/or the error responses can be correctly processed.

Some embodiments may comprise the step of determining a characteristic of the provider. Exemplary embodiments may comprise the step of obtaining information relating to one or more characteristics of the provider from data repository. For instance, characteristics of the provider may be determined during a design stage (e.g. at design-time) and then information about the previously determined characteristics may be reference at run-time, thus minimizing run-time resource requirements.

According to another exemplary embodiment of the present invention, there is provided a computer program product for error handling between a requester and provider, the computer program product comprising a computer readable storage medium having program instructions embodied therewith, the program instructions executable by a processing unit to cause the processing unit to perform a method according to one or more exemplary embodiments when executed on at least one processor of a data processing system.

According to yet another exemplary embodiment, there is provided a data processing system comprising at least one processor and the computer program product according to one or more embodiments, wherein the at least one processor is configured to execute the computer program code of the computer program product. The data processing system may be configured to act as a message broker between a message producer and a message consumer. Further, the data processing system may be configured to implement a part of a service-oriented architecture.

Embodiments may therefore be employed in a Service-Oriented Architecture (SOA) for the provision of services over a network, such as the Internet. To this end, a SOA typically comprises a message broker, which is a software module implementing the required message (e.g. request) conversion or data extraction. A message broker may have access to so-called message schemas, which define the structure and the type of content that each data field within the message can contain.

According to yet another exemplary embodiment, there is provided an error handling component for error handling between a requester and provider. The component comprises an input interface configured to receive, from the requester, a request for a service of the provider. The component may also include an analysis component configured to determine a requirement of the request. Furthermore, the component comprises an algorithm component configured to determine a handling algorithm for handling errors based on the determined requirement of the request and a characteristic of the service provider.

Exemplary embodiments may provide a technology-agnostic declarative error handling component that is configured to intercept requests on a given integration, wherein the integration may be defined by a set of requester requirements and provider characteristics. Based on requirements of the requester and characteristics of the provider, such as capabilities of the provider, the component may select and implement an error handling algorithm to manage errors that may occur, such as providing missing behaviors and allowing reclassification of non-standard error responses.

The component may thus be arranged as an interceptor to any interaction, alleviating a need for unique/custom coding that may otherwise be required to manage the multiple permutations of errors that could occur. Embodiments of the components may use technology agnostic characteristics and implement logical algorithms that are not specific to any language, protocol or transport. Such logical algorithms may then be implemented across multiple language runtimes so that once the characteristics for a given interaction have been agreed, providing a connector across multiple languages may become simply a matter of copying the configuration.

Also, in the context of the present application, a data processing system may be a single device or a collection of distributed devices that are adapted to execute one or more embodiments of the methods of the present invention. For instance, a system may be a personal computer (PC), a server or a collection of PCs and/or servers connected via a network such as a local area network, the Internet and so on to cooperatively execute at least one embodiment of the methods of the present invention.

Embodiments of the present invention elate to error handling between a requester and provider. By evaluation of one or more requirements of a request and one or more characteristics of the provider, an algorithm for handling errors may be determined. Exemplary embodiments may therefore enable configuration and implementation of common/generic error handling logic/algorithms/scenarios/semantics in a technology agnostic fashion, thus reducing integration implementation code and providing portability across platforms.

For instance, embodiments of the present invention may provide a declarative error handling concept that intercepts requests on a given integration, wherein the integration is defined by a set of requester requirements and provider characteristics. Based on these requirements and characteristics, an algorithm for managing errors may be identified and subsequently employed. By categorizing an interface by characteristics of the interface, and given a set of client (e.g. requester) requirements, exemplary embodiments may identify an error handling algorithm and inject that algorithm into a process flow. The injected error handling algorithm may also be configured to provide any missing characteristics of the provider for example.

Exemplary embodiments may therefore analyze integration requirements and/or characteristics to determine the most appropriate error handling process(es). Dynamic error handling optimization may therefore be provided by proposed embodiments.

Although downstream invocations may appear to adhere to a standard, invocations may not strictly implement the "style" of that standard. For example, invocations may not use HTTP response codes correctly, or may not be truly RESTful, or may not use SOAP faults correctly. These small subtleties may result in a need for excessive amounts of response handling code, such as code for managing errors that are not really errors, and/or the provision of apparently successful responses that were in fact error responses. Embodiments of the present invention may configure response overrides such that a target that is misusing a known style can be re-shaped into a more conforming response, which may greatly improve a re-usability of error handling algorithms, as the error handling algorithms need not cater for the subtleties of individual interfaces.

Exemplary embodiments may be extensible such that new characteristics and algorithms can be added to cater for the evolution of integration requirements. For example, recent developments in the field of distributed processing have moved from most integrations being based over highly-reliable controlled transports and highly-transactional protocols, to web service and restful interfaces that are not transactional and are performed over unreliable mediums. Such developments introduce new characteristics and algorithms, although the core intent of the declarative error handling component will have remained the same.

Exemplary embodiments of a method or component for interaction between systems may address a number of high-level questions regarding requirements and/or characteristics of an interaction. Although examples are detailed below, it is to be understood that other embodiments may be implemented using the concept(s) proposed herein.

Modifications and additional steps to a traditional error handling concepts may also be proposed which may enhance the value and utility of the proposed concepts.

Figure 2:
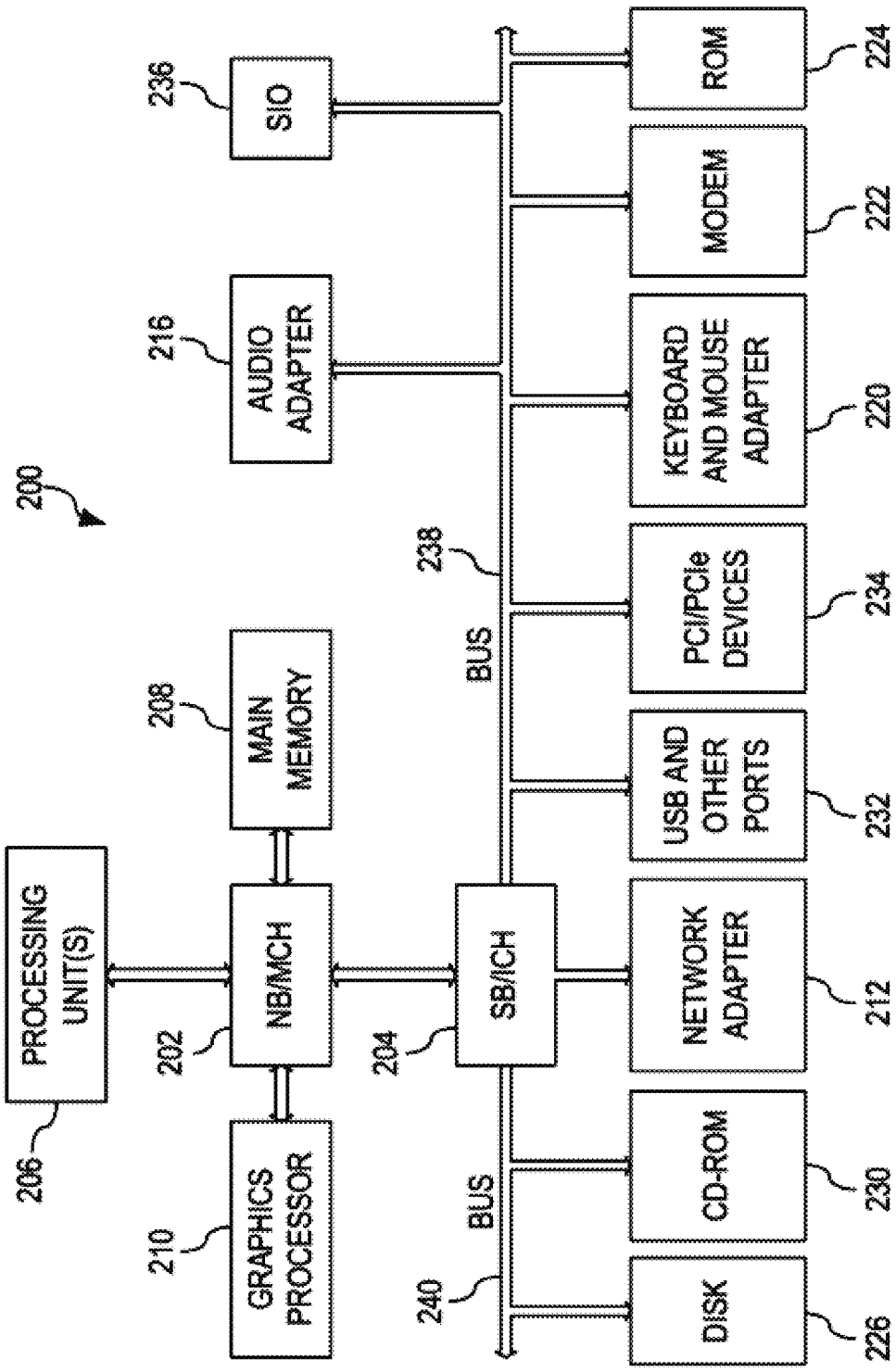
FIG. 2 depicts a block diagram of an example data processing system in which aspects of the illustrative embodiments may be implemented, in accordance with embodiments of the present invention.

Illustrative embodiments may be utilized in many different types of processing environments. In order to provide a context for the description of elements and functionality of the illustrative embodiments, FIGS. 1 and 2 are provided hereafter as example environments in which aspects of the illustrative embodiments may be implemented. FIGS. 1 and 2 are only examples and are not intended to assert or imply any limitation with regard to the environments in which aspects or embodiments of the present invention may be implemented. Many modifications to the depicted environments may be made without departing from the spirit and scope of the present invention.

FIG. 1 depicts a pictorial representation of an example distributed system in which aspects of the illustrative embodiments may be implemented, in accordance with embodiments of the present invention. Distributed system 100 may include a network of computers in which aspects of the illustrative embodiments may be implemented. The distributed system 100 contains at least one network 102, which is the medium used to provide communication links between various devices and computers connected together within the distributed data processing system 100. The network 102 may include connections, such as wire, wireless communication links, or fiber optic cables.

In the depicted example, a first server 104 and second server 106 are connected to the network 102 along with a storage unit 108. In addition, clients 110, 112, and 114 are also connected to the network 102. The clients 110, 112, and 114 may be, for example, personal computers, network computers, or the like. In the depicted example, the first server 104 provides data, such as boot files, operating system images, and applications to the clients 110, 112, and 114. Clients 110, 112, and 114 are clients to the first server 104 in the depicted example. The distributed processing system 100 may include additional servers, clients, and other devices not shown.

In the depicted example, the distributed system 100 is the Internet with the network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

FIG. 2 depicts a block diagram of an example system 200 in which aspects of the illustrative embodiments may be implemented, in accordance with embodiments of the present invention. The system 200 is an example of a computer, such as client 110 in FIG. 1, in which computer usable code or instructions implementing the processes for illustrative embodiments of the present invention may be located.

In the depicted example, the system 200 may employ a hub architecture including a north bridge and memory controller hub (NB/MCH) 202 and a south bridge and input/output (I/O) controller hub (SB/ICH) 204. A processing unit 206, a main memory 208, and a graphics processor 210 are connected to NB/MCH 202. The graphics processor 210 may be connected to the NB/MCH 202 through an accelerated graphics port (AGP).

In the depicted example, a local area network (LAN) adapter co to SB/ICH 204. An audio adapter 216, a keyboard and a mouse adapter 220, a modem 222, a read only memory (ROM) 224, a hard disk drive (MD) 226, a CD-ROM drive 230, a universal serial bus (USB) ports and other communication ports 232, and PCI/PCIe devices 234 connect to the SR/ICH 204 through first bus 238 and second bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

The HDI) 226 and CD-ROM drive 230 connect to the KWH 204 through second bus 240. The HDD 226 and CD-ROM drive 230 may use, for example, an integrated drive electronics (IDE) or a serial advanced technology attachment (SATA) interface. Super I/O (SIO) device 236 may be connected to SB/ICH 204.

An operating system runs on the processing unit 206. The operating system coordinates and provides control of various components within the system 200 in FIG. 2. As a client, the operating system may be a commercially available operating system. An object-oriented programming system, such as the Java™ programming system, may run in conjunction with the operating system and provides calls to the operating system from Java™ programs or applications executing on system 200.

As a server, system 200 may be, for example, an IBM® eServer™ System P® computer system, running the Advanced Interactive Executive (AIX®) operating system or the LINUX® operating system. The system 200 may be a symmetric multiprocessor (SMP) system including a plurality of processors in processing unit 206. Alternatively, a single processor system may be employed.

Instructions for the operating system, the programming system, and applications or programs are located on storage devices, such as HDD 226, and may be loaded into main memory 208 for execution by processing unit 206. Similarly, one or more message processing programs according to an embodiment may be configured to be stored by the storage devices and/or the main memory 208.

The processes for illustrative embodiments of the present invention may be performed by processing unit 206 using computer usable program code, which may be located in a memory such as, for example, main memory 208, ROM 224, or in one or more peripheral devices 226 and 230.

A bus system, such as first bus 238 or second bus 240 as shown in FIG. 2, may comprise one or more buses. Of course, the bus system ay be implemented using any type of communication fabric or architecture that provides for a transfer of data between different components or devices attached to the fabric or architecture. A communication unit, such as the modem 222 or the network adapter 212 of FIG. 2, may include one or more devices used to transmit and receive data. A memory may be, for example, main memory 208, ROM 224, or a cache such as found in NB/MCH 202 in FIG. 2.

The hardware in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system, other than the system mentioned previously, without departing from the spirit and scope of the present invention.

Moreover, the system may take the form of any of a number of different data processing systems including client computing devices, server computing devices, a tablet computer, laptop computer, telephone or other communication device, a personal digital assistant (PDA), or the like. In some illustrative examples, the system 200 may be a portable computing device that is configured with flash memory to provide non-volatile memory for storing operating system files and/or user-generated data, for example. Thus, the system 200 may essentially be any known or later-developed data processing system without architectural limitation.

Figure 3:
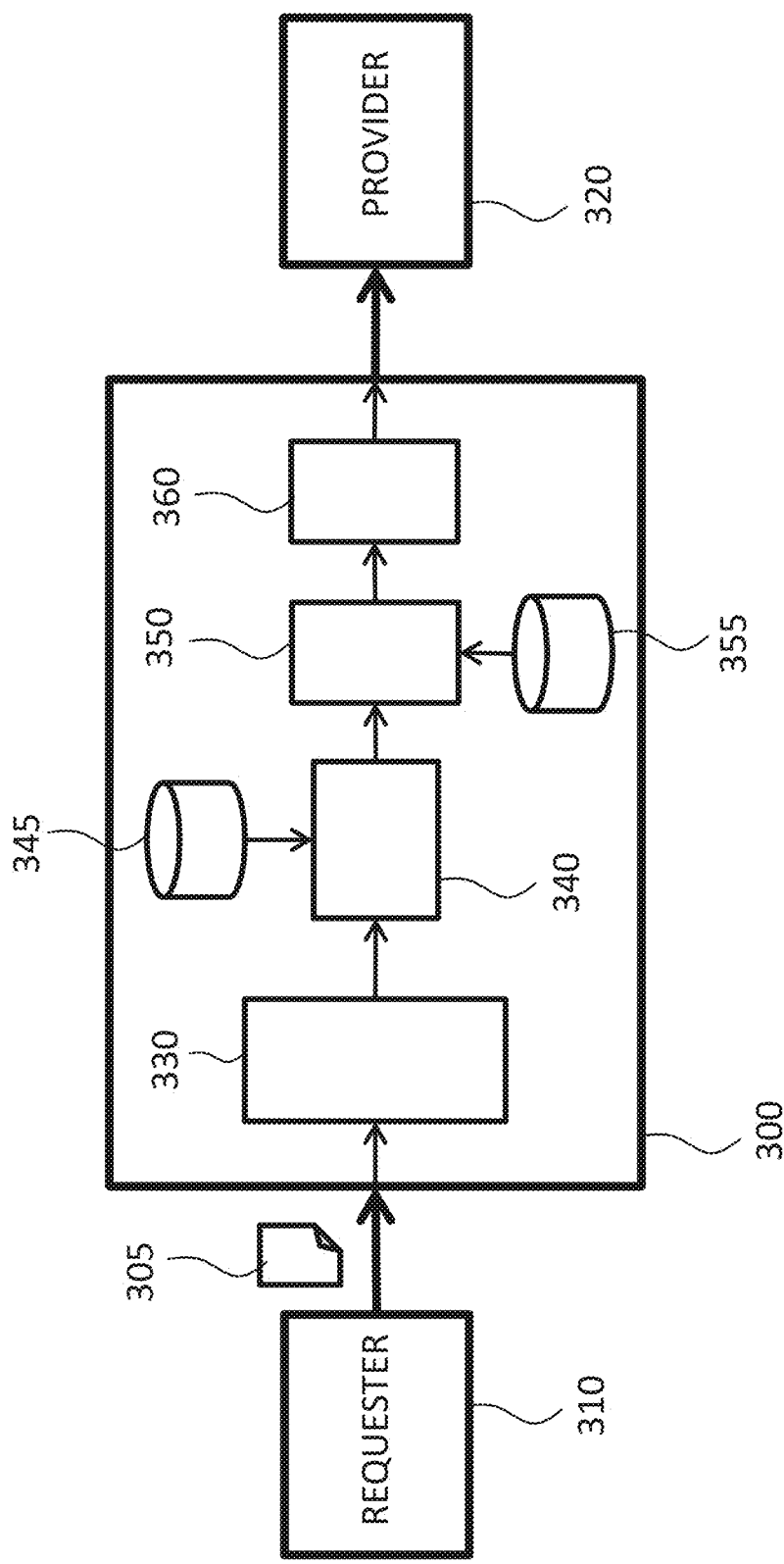
FIG. 3 depicts a simplified block diagram of an exemplary implementation of an error handling component, in accordance with embodiments of the present invention.

Turning now to FIG. 3, an exemplary implementation of an error handling component 300 according to an embodiment will now be described. FIG. 3 depicts a simplified block diagram of an exemplary implementation of an error handling component 300, in accordance with embodiments of the present invention. The error handling component 300 may be for error handling between a requester 310, such as a network node requesting a service, and provider 320, such as a network node adapted to provide one or more services in response to received requests.

The error handling component 300 may comprise an input interface 330 that is configured to receive, from the requester 310, a request 305 for a service of the provider 320.

The input interface 330 may be configured to pass the received request 305 to an analysis component 340 of the error handling component 300.

The analysis component 340 may be arranged to determine a requirement of the request 305. In an exemplary embodiment, the analysis component 340 may be configured to access a database 345 provisioned as part of the error handling component 300, wherein the database 345 may be configured to store information relating to requirements and/or characteristics of requests, requesters and/or providers. Such information may, for example, comprise information regarding request properties, requester requirements, requester characteristics, provider characteristics, node capabilities, interface capabilities, and the like. Using such information from the database 345 in combination with the request 305, the analysis component may be configured to determine one or more requirements of the request. The determined requirement(s) may, for example, relate to: an acceptability of duplicates; a confirmation required by the requester; a response time; a throughput; and/or a transactional participation.

The analysis component 340 may also be arranged to identify a characteristic of the provider. For example, the analysis component 340 may be configured to access the database 345 and use information from the database 345 in combination with the request 305 to determine one or more characteristics of the provider 320. In this way, the database 345 may store information about characteristics of the provider 320 that have been determined at a design or creation stage, and the information may then be simply referenced by the analysis component 340 at run-time. The determined characteristic(s) may, for example, relate to: an interface of the provider; a communication protocol of the provider; availability of a check test; a response time; a throughput; an interaction method of the provider; an idempotent capability of the provider; a synchronous or asynchronous nature of the provider; one or more error types; transaction support; and a behavioral trait of the provider.

The analysis component 340 may be configured to pass information about the determined requirement(s) of the request and the determined characteristic(s) of the provider to an algorithm component 350 of the error handling component 300. Based on the information about the determined requirement of the request and the determined characteristic of the provider, the algorithm component 350 may be configured to determine a handling algorithm for handling errors. For this purpose, the algorithm component 350 may be configured to access information of a second database 355 provisioned as part of the error handling component 300. The second database 355 may, for example, store information useful for the determination of a handling algorithm, such as a set of available algorithms and/or algorithm selection rules for example.

In an exemplary embodiment, the algorithm component 350 may select the handling algorithm from a plurality of algorithms based on the determined requirement of the request and the determined characteristic of the provider. For instance, the algorithm component 350 may select the handling algorithm based on whether the determined requirement(s) of the request and/or the determined characteristic(s) of the provider relate to a predetermined communication protocol. For example, the algorithm component 350 may employ algorithm selection rules for common protocols (e.g.

SOAP/HTTP), or indeed common systems and then re-use an algorithm, or use an algorithm as a starting point for similar endpoints.

Alternatively, or additionally, the algorithm component 350 may elect the handling algorithm according to a best-fit assessment.

The algorithm component 350 may pass the selected handling algorithm to an execution component 360 of the error handling component 300, wherein the execution component 360 may be configured to invoke the request at the provider 320 in accordance with the handling algorithm The execution component 360 may undertake runtime execution of a handling algorithm so as to facilitate handling of request invocation and/or error management, which may be done in real-time (e.g. at run-time).

By way of demonstrating an implementation of the error handling component 300 of FIG. 3, the handling algorithm may be configured to assure delivery of the request 305 to the provider 320 and, for this purpose, the handling algorithm may implement at least one of: a retry procedure; a defer procedure; a comparison; and a merge procedure so as to assure delivery of the request to the provider.

From the above description of an error handling component 300 according to an exemplary embodiment, there may be provided a declarative error handler component 300 that may sit in-between a requester 310 and provider 320.

Embodiments of the component 300 may be provisioned within a requester runtime, within an intermediate middleware, such as a broker or connector, or within a provider. Embodiments may use the requester requirements and, provider characteristics in combination with a set of selection rules to select an appropriate error handling algorithm, which may be done at design time (e.g. for performance reasons), or the selection may be done at runtime and cached for example.

Considerations for determining an error handling algorithm may be separated into a number of different categories, such as (i) provider interface characteristics; (ii) requester requirements; and (iii) component capabilities.

(I) Provider Interface Characteristics

Provider Interface Characteristics may comprise characteristics about the providers interface. Examples may include: whether the transport medium provides certainty of interaction (for example, is an in-doubt request possible); if a health check test is available to see if the provider is accepting requests; what response time is achievable; what throughput is achievable; whether sessions/connections need to be retained across separate interactions for efficiency; and whether the provided client for the interface results in a blocking, call-back, or a polling style interaction.

It is noted that many of these characteristics, including some of the above, may differ for different operations on the providers interface. Examples of characteristics that are often operation specific may include: whether the interaction performs only a "read" of data, or results in a "data change"-A "change" could be further split into create, update, delete etc.; whether the interface is idempotent (handles duplicate requests); whether the provider performs the action immediately or whether completion occurs asynchronously after the request has responded with an acknowledgement; how and when the provider will behave if the action takes longer than expected—e.g. timeout and rollback, or respond with acknowledgement of receipt and continue asynchronously, or respond with in-doubt status.

Many of the above may of course already be known if another interface has been implemented to this system. Some of the characteristics may be easily derived if the provider is using a well-known standard for the protocol and transport such as web services, or REST, or Java Database Connectivity (JDBC).

(II) Requestor Requirements

Requestor Requirements may comprise requirements relating to the requesters needs/expectations regarding the interaction with the provider. Examples may include: whether duplicates would be acceptable; whether the requester requires confirmation that the action has taken place in the backend system immediately (i.e. before it can continue), or whether a deferred confirmation would suffice, or indeed whether no confirmation is required; what response times are required; and what throughput is required.

(III) Component Capabilities

Component Capabilities may comprise capabilities available to the Declarative Error Handler (DEM component. Examples may include: response caching, for example, to manage differences in response time expectations for requests; store forward (e.g. event storage); and unique key store of, for example, transactions that have been processed.

Example Policy Vocabulary

Based on the above, the vocabulary to craft the logic of the policy algorithms may be as follows:

Requestor Requirements, which may be over-ridden by the incoming request: Duplicates Matter; Blocking; SLA; and Transactional participation.

Requestor Characteristics: Duplicates Possible.

Provider Characteristics: Operation Verb; Operation Type; Current State Readable?; Idempotent/Retryable; Assured Completion Time; Protocol Synchronous/Asynchronous; Error Types; Operational State; Transaction Support.

Algorithm: Assured Delivery

Sub-algorithms: Retry; Compare; Merge.

Component Capability: Service-Level Agreements (SLA) measurement.

In an exemplary embodiment, an example will now be considered which involves a HTTP-based SOAP request. For such an example, a particular provider might have the interface characteristics of a "Create" operation over an "unreliable medium", that is "idempotent", and the requester requirements might be that there are "no duplicates". Embodiments of the present invention may identify the requester requirements and interface characteristics and identify (e.g. select) a handling algorithm such as a "Create over unreliable medium" algorithm. The request may then be invoked on the provider in accordance with the algorithm using the requester requirement "no duplicates" and the interface characteristic of "not idempotent".

Figure 4:
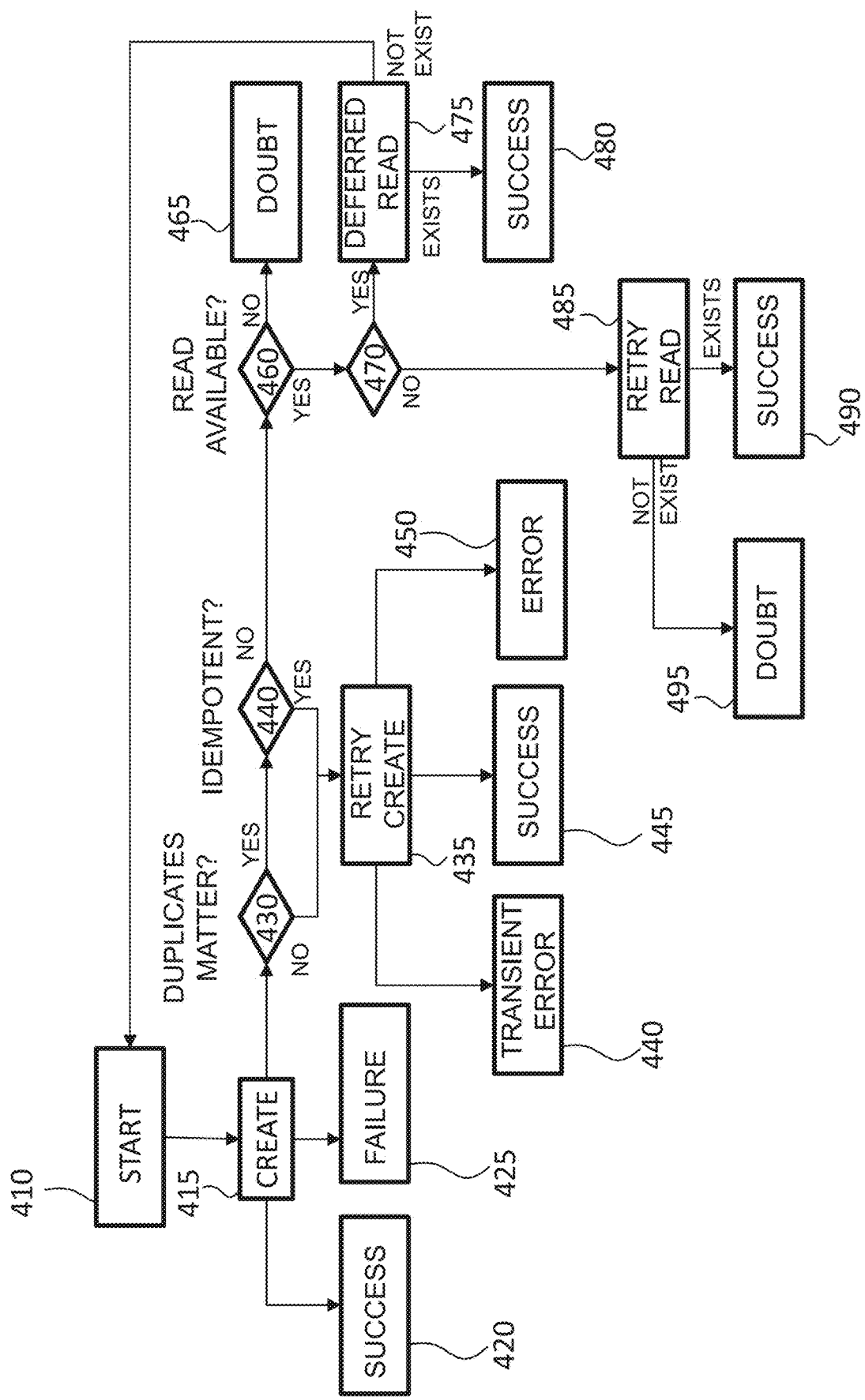
FIG. 4 depicts a flow diagram of a handling algorithm in accordance with embodiments of the present invention.

An example of such an algorithm is depicted as a flow diagram in FIG. 4. FIG. 4 depicts a flow diagram of a handling algorithm in accordance with embodiments of the present invention. For such an algorithm, assumptions are made that a synchronous transport protocol (e.g. HTTP) is employed and that an unreliable communication medium (e.g. the Internet) is employed.

The algorithm starts in step 410 and proceeds to step 415 when the Create operation is implemented. If the Create operation is successful, the method proceeds to step 420 wherein the success is reported. If, however, a permanent error occurs due to Create operation of step 415, the method proceeds to step 425 wherein failure is reported. If, due to the Create operation of step 415, a transient error occurs, the method proceeds to step 430 wherein it is determined whether or not duplicates matter.

If duplicates do indeed matter, the method proceeds to step 435, wherein the create operation is retried. Conversely, if duplicates do not matter, the method proceeds to step 440 wherein it is determined whether or not the interface is idempotent. If the interface is idempotent, the method proceeds to step 435.

If, due to the retry of the create operation of step 435, a transient error occurs, the method proceeds to step 440 wherein the transient error is reported. If retry of the Create operation in step 435 is successful, the method proceeds to step 445 wherein the success is reported. If, however, a permanent error occurs due to the retry of the Create operation in step 435, the method proceeds to step 450 wherein the error is reported.

Returning to consider step 440, wherein it is determined whether or not the interface is idempotent, if the interface is not idempotent, the method proceeds to step 460. In step 460, it is determined whether or not the Read operation is available. If it is determined that the Read operation is not available, the method proceeds to step 465 in which an indication of doubt is provided. Conversely, if it is determined in step 460 that the Read operation is available, the method proceeds to step 470 in which it is determined whether there is an assured completion time for the Create operation.

If, in step 470, it is determined that there is an assured completion time for the Create operation, the method proceeds to step 475 in which a deferred read operation is undertaken. If the deferred read in step 475 indicates existence, the method proceeds to step 480 wherein success is reported. Conversely, if the deferred read in step 475 indicates non-existence, the method returns to the start 410 of the method.

If, however, it is determined in step 470 that there is no assured completion time for the Create operation, the method proceeds to step 485 in which a read operation is undertaken. If the retry read in step 485 indicates existence, e method proceeds to step 490 wherein success is reported. Conversely, if the retry read in step 485 indicates non-existence, the method proceeds to step 495 in which an indication of doubt is provided.

The example algorithm depicted in FIG. 4 causes automatic retrying of transient errors safe in the knowledge that no duplicates will be created due to the idempotent provider.

The target may not have a correct representation of the difference between "permanent" and "transient" errors. The pluggable "response interpreters" are able to unpick the pertinent information from the protocol into an agnostic response that can be used by the algorithm. For example, if an apparently successful response SOAP message is actually used to represent a form of transient error, this can be caught and translated to the correct transient error result for the algorithm.

So in summary, the error handling logic of the interface has been implemented purely by a domain specific policy language and making use of standard policy algorithms. Also, it will be understood that the algorithm depicted by the flow diagram of FIG. 4 may be converted into an executable language and run by the processing engine, in the same way executable engines work, for example for business process execution language (BPEL) engines.

Figure 5:
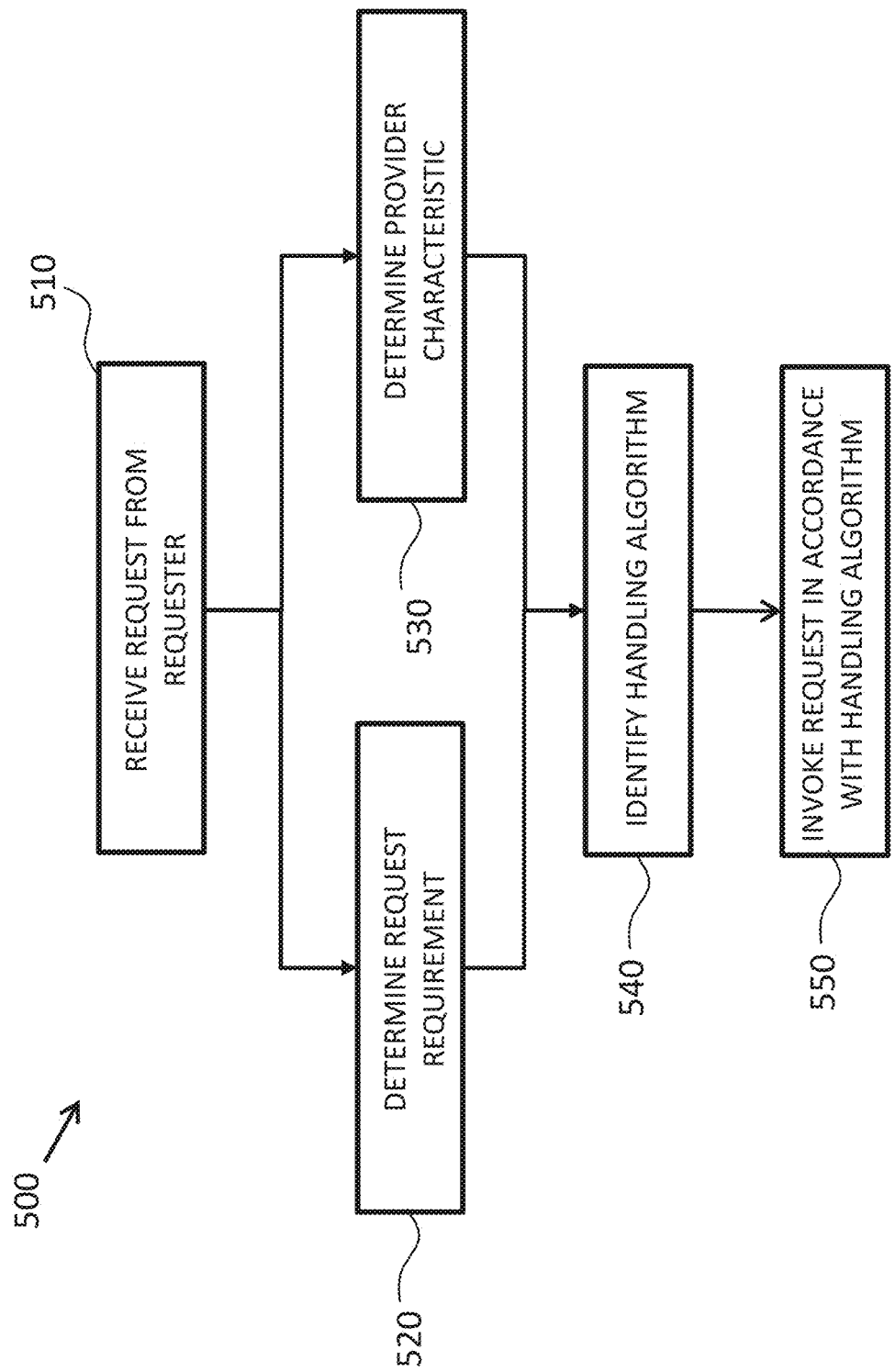
FIG. 5 depicts a flow diagram of a computer-implemented method, in accordance with embodiments of the present invention.

Turning to FIG. 5, which depicts a flow diagram of a computer-implemented method 500, in accordance with embodiments of the present invention. The method begins in step 510 wherein a request for a service of a provider is received (e.g. from an originating requester). Next, in step 520, a requirement of the request is determined and, in step 530, a characteristic of the provider is determined. Here, steps 520 and 530 may be completed separately and in any suitable order. For example, step 530 may be undertaken before step 520, or step 520 and 530 may be undertaken in parallel.

Next, in step 540, a handling algorithm for handling errors is identified based on the determined requirement of the request and the determined characteristic of the service provider. Such identification may, for example, be achieved by selecting an algorithm from a set of available algorithms.

Finally, in step 550, the request is invoked at the provider in accordance with the handling algorithm.

It will be appreciated that embodiments, such as that presented above with reference to FIGS. 1-5, may provide an integration between requester and provider that is defined by a set of requester requirements and provider characteristics. Based on the requester requirement and provider characteristics, an embodiment may inject an error handling algorithm into a process flow so as to manage errors that may occur. The injected algorithm may, for example, provide missing or required behaviors and/or enable reclassification of non-standard error responses. In this way, positive responses that may have otherwise not been identified as errors may be detected and processed.

In some embodiments, there may be provided a system comprising a processing arrangement adapted to carry out any method previously described with reference to FIGS. 1 to 5.

Figure 6:
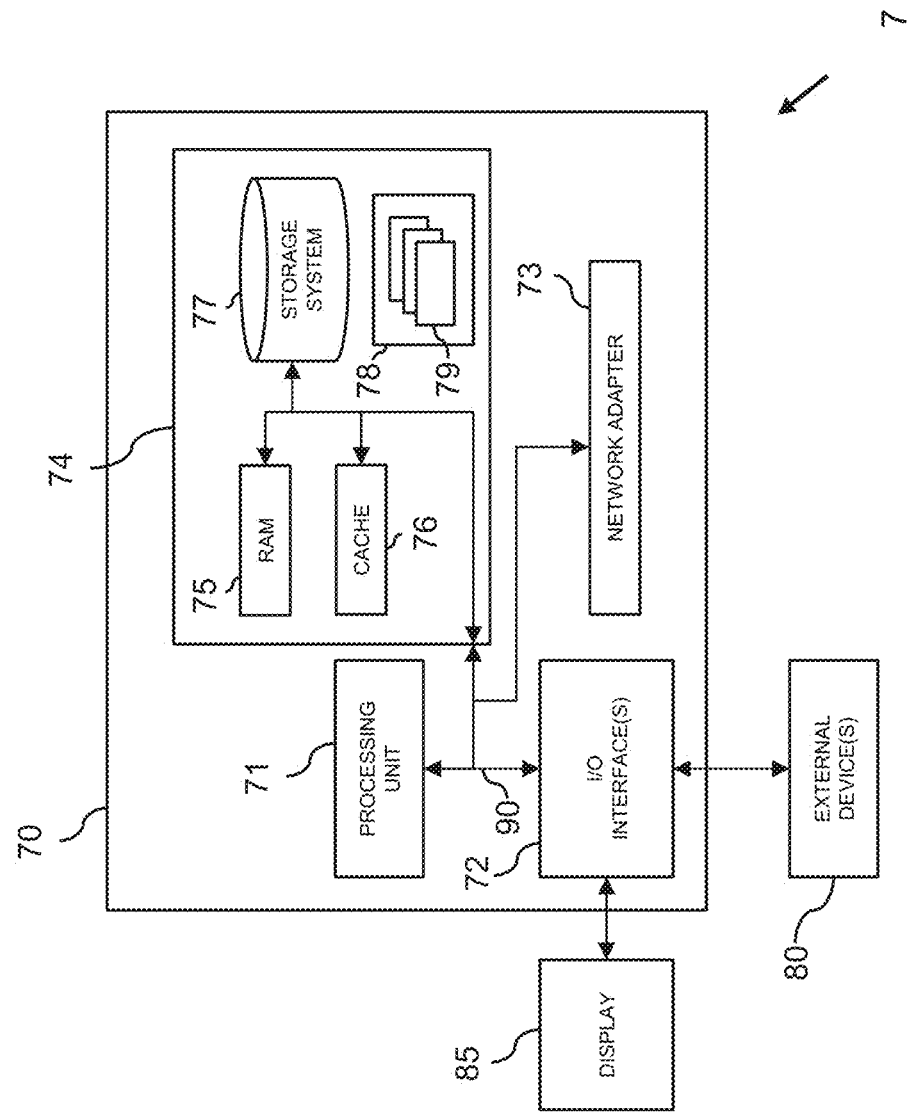
FIG. 6 illustrates a system configured to generate a contribution score, in accordance with embodiment of the present invention.

FIG. 6 depicts a system configured to generate a contribution score, in accordance with embodiment of the present invention. By way of example, as illustrated in FIG. 6, embodiments may comprise a computer system 70, which may form part of a networked system. The components of computer system/server 70 may include, but are not limited to, one or more processing arrangements, for example, comprising processors or processing units 71, a system memory 74, and a bus 90 that couples various system components including system memory 74 to processing unit 71.

Bus 90 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 70 typically includes a variety of computer system readable media. Such computer system readable media may be any available media that is accessible by computer system/server 70, and the computer system readable media includes both volatile and non-volatile media, removable and non-removable media.

System memory 74 can include computer system readable media in the form of volatile memory, such as random access memory (RAM) 75 and/or cache memory 76. Computer system/server 70 may further include other removable/non-removable, volatile/non-volatile computer system storage media. By way of example only, storage system 74 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 90 by one or more data media interfaces. As will be further depicted and described below, memory 74 may include at least one program product having a set (e.g., at least one) of program modules that are configured to carry out the functions of embodiments of the invention.

Program/utility 78, having a set (e.g. at least one) of program modules 79, may be stored in memory 74 by way of example, and not limitation, as well as an operating system, one or more application programs, other program modules, and program data. Each of the operating system, one or more application programs, other program modules, and program data or some combination thereof, may include an implementation of a networking environment. Program modules 79 generally carry out the functions and/or methodologies of embodiments of the invention as described herein.

Computer system/server 70 may also communicate with one or more external devices 80 such as a keyboard, a pointing device, a display 85, etc.; one or more devices that enable a user to interact with computer system/server 70; and/or any devices (e.g., network card, modem, etc.) that enable computer system/server 70 to communicate with one or more other computing devices. Such communication can occur via Input/Output (I/O) interfaces 72. Still yet, computer system/server 70 can communicate with one or more networks such as a local area network (LAN), a general wide area network (WAN), and/or a public network (e.g., the Internet) via network adapter 73. As depicted, network adapter 73 communicates with the other components of computer system/server 70 via bus 90. Although not shown, other hardware and/or software components could be used in conjunction with computer system/server 70. Examples, include, but are not limited to: microcode, device drivers, redundant processing units, external disk drive arrays, RAID systems, tape drives, and data archival storage systems, etc.

In the context of the present application, where embodiments of the present invention constitute a method, it should be understood that such a method is a process for execution by a computer, i.e. is a computer-implementable method. The various steps of the method therefore reflect various parts of a computer program, e.g. various parts of one or more algorithms.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a storage class memory (SCM), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In one embodiment, the system of the present invention may be or include a hardware device such as a computer, portable device, etc. In one embodiment, the hardware device is or includes a special-purpose device (e.g., computer, machine, portable device) that comprises specialized, non-generic hardware and circuitry (i.e., specialized discrete non-generic analog, digital, and logic based circuitry) for (independently or in combination) particularized for executing only methods of the present invention. The specialized discrete non-generic analog, digital, and logic based circuitry may include proprietary specially designed components (e.g. a specialized integrated circuit, such as for example an Application Specific Integrated Circuit (ASIC), designed for only implementing methods of the present invention).

In another embodiment, the proposed invention solves a technical problem necessarily rooted in computer technology because the resulting graph may improve search engine technology, which saves computer resources by providing relevant information in a location that allows the user to avoid navigating to additional website or perform additional searching for information.

A computer program product of the present invention may include one or more computer readable hardware storage devices having computer readable program code stored therein, said program code containing instructions executable by one or more processors of a computing system (or computer system) to implement the methods of the present invention.

A computer system of the present invention may include one or more processors, one or more memories, and one or more computer readable hardware storage devices, said one or more hardware storage devices containing program code executable by the one or more processors via the one or more memories to implement the methods of the present invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The claims are as follows:

1. A method for error handling between a requester and provider comprising:
   receiving, by a processor of a computing system, a request for a service of the provider, from the requester;
   determining, by the processor, a requirement of the request, which comprise requirements relating to needs and expectations of the requester regarding an interaction with the provider, and
   identifying, by the processor, a handling algorithm for handling errors based on the requirement of the request and a characteristic of the service provider, wherein the handling algorithm is technology agnostic and implemented by configuration, across multiple technologies.

2. The method of claim 1, further comprising:
   invoking, by the processor, the request at the provider in accordance with the handling algorithm.

3. The method of claim 1, wherein the requirement of the request relates to t least one of:
   an acceptability of duplicates;
   a confirmation required by the requester;
   a response time;
   a throughput; and
   a transactional participation.

4. The method of claim 1, wherein the characteristic of the provider relates to at least one of:
   an interface of the provider;
   a communication protocol of the provider;
   availability of a check test;
   a response time;
   a throughput;
   an interaction method of the provider;
   an idempotent capability of the provider;
   a synchronous or asynchronous nature of the provider;
   one or more error types;
   transaction support; and
   a behavioral trait of the provider.

5. The method of claim 1, wherein identifying comprises:
   selecting, by the processor, the handling algorithm from a plurality of algorithms based on the requirement of the request and the characteristic of the provider.

6. The method of claim 5, wherein selecting the handling algorithm comprises selecting the handling algorithm based on whether the requirement of the request or the characteristic of the provider relates to a predetermined communication protocol.

7. The method of claim 5, wherein the step of identifying a handling algorithm comprises selecting the handling algorithm according to a best-fit assessment.

8. The method of claim 1, wherein the handling algorithm is configured to assure delivery of the request to the provider, and wherein the handling algorithm is configured to implement at least one of: a retry procedure; a defer procedure; a comparison; and a merge procedure so as to assure delivery of the request to the provider.

9. The method of claim 1, further comprising the step of:
determining, by the processor, a characteristic of the provider, and wherein determining the characteristic of the provider comprises obtaining information relating to one or more characteristics of the provider from a data repository.

10. A computer program product for error handling between a requester and provider, the computer program product comprising a computer readable storage medium having program instructions embodied therewith, the program instructions executable by a processing unit to cause the processing unit to perform a method comprising:
receiving, by a processor of a computing system, a request for a service of the provider, from the requester;
determining, by the processor, a requirement of the request, which comprise requirements relating to needs and expectations of the requester regarding an interaction with the provider, and identifying, by the processor, a handling algorithm for handling errors based on the requirement of the request and a characteristic of the service provider, wherein the handling algorithm is technology agnostic and implemented by configuration, across multiple technologies.

11. A data processing system comprising at least one processor and the computer program product of claim 10, wherein the at least one processor is configured to execute the computer program code of the computer program product.

12. The data processing system of claim 11, wherein the data processing system is configured to act as a message broker between a message producer and a message consumer.

13. The data processing system of claim 11, wherein the data processing system is configured to implement a part of a service-oriented architecture.

14. An error handling component, for error handling between a requester and provider, the component comprising:
an input interface configured to receive, from the requester, a request for a service of the provider;
an analysis component configured to determine a requirement of the request, which comprise requirements relating to needs and expectations of the requester regarding an interaction with the provider; and
an algorithm component configured to determine a handling algorithm for handling errors based on the requirement of the request and a characteristic of the provider, wherein the handling algorithm is technology agnostic and implemented by configuration, across multiple technologies.

15. The error handling component of claim 14, further comprising:
an execution component configured to invoke the request at the provider in accordance with the handling algorithm.

16. The error handling component of claim 14, wherein the requirement of the request relates to at least one of:
an acceptability of duplicates;
a confirmation required by the requester;
a response time;
a throughput; and
a transactional participation.

17. The error handling component of claim 14, wherein the characteristic of the provider relates to at least one of:
an interface of the provider;
a communication protocol of the provider;
availability of a check test;
a response time;
a throughput;
an interaction method of the provider;
an idempotent capability of the provider;
a synchronous or asynchronous nature of the provider;
one or more error types;
transaction support; and
a behavioral trait of the provider.

18. The error handling component of claim 14, wherein the algorithm component is configured to select the handling algorithm from a plurality of algorithms based on the requirement of the request and the characteristic of the provider.

19. The error handling component of claim 18, wherein the algorithm component is configured to select the handling algorithm based on whether the requirement of the request or the characteristic of the provider relates to a predetermined communication protocol.

20. The error handling component of claim 18, wherein the algorithm component is configured to select the handling algorithm according to a best-fit assessment.

21. The error handling component of claim 14, wherein the analysis component is configured to determine a characteristic of the provider, and wherein the analysis component is configured to obtain information relating to one or more characteristics of the provider from a data repository.

22. The error handling component of claim 14, wherein the handling algorithm is configured to assure delivery of the request to the provider, and wherein the handling algorithm is configured to implement at least one of: a retry procedure; a defer procedure; a comparison; and a merge procedure so as to assure delivery of the request to the provider.

* * * * *